United States Patent
Chang et al.

(10) Patent No.: US 10,761,382 B2
(45) Date of Patent: Sep. 1, 2020

(54) PIXEL STRUCTURE

(71) Applicant: Au Optronics Corporation, Hsinchu (TW)

(72) Inventors: Chan-Yuen Chang, Pingtung County (TW); Chun-Ru Huang, New Taipei (TW); Chao-Wei Yeh, Taoyuan (TW)

(73) Assignee: Au Optronics Corporation, Hsinchu (TW)

( * ) Notice: Subject to any disclaimer, the term of this patent is extended or adjusted under 35 U.S.C. 154(b) by 17 days.

(21) Appl. No.: 16/033,227

(22) Filed: Jul. 12, 2018

(65) Prior Publication Data

US 2019/0094632 A1 Mar. 28, 2019

(30) Foreign Application Priority Data

Sep. 25, 2017 (TW) ............... 106132759 A

(51) Int. Cl.
| G02F 1/1343 | (2006.01) |
| G02F 1/1335 | (2006.01) |
| G02F 1/1362 | (2006.01) |
| G02F 1/1368 | (2006.01) |

(52) U.S. Cl.
CPC ...... *G02F 1/134309* (2013.01); *G02F 1/1368* (2013.01); *G02F 1/133514* (2013.01); *G02F 1/136286* (2013.01); *G02F 1/136209* (2013.01); *G02F 2001/134372* (2013.01); *G02F 2201/121* (2013.01); *G02F 2201/123* (2013.01)

(58) Field of Classification Search
CPC ......... G02F 1/134309; G02F 1/133514; G02F 1/136209; G02F 1/136286; G02F 1/1368; G02F 2001/134372; G02F 2201/121; G02F 2201/123

USPC ........................................................ 349/43
See application file for complete search history.

(56) References Cited

U.S. PATENT DOCUMENTS

| 9,599,870 B2 | 3/2017 | Lin et al. |
| 2005/0046763 A1 | 3/2005 | Ono et al. |

(Continued)

FOREIGN PATENT DOCUMENTS

| CN | 1591099 | 3/2005 |
| CN | 102967977 | 3/2013 |
| CN | 104267534 A * | 1/2015 |

(Continued)

*Primary Examiner* — Nathanael R Briggs
*Assistant Examiner* — William D Peterson
(74) *Attorney, Agent, or Firm* — JCIPRNET

(57) ABSTRACT

A pixel structure including a substrate, a signal line, a plurality of pixel units and a light blocking pattern layer is provided. The signal line is disposed on the substrate and has opposing first and second sides. Two adjacent pixel units are disposed respectively on the first side and the second side of the signal line. Each pixel units includes an active device, a common electrode, an insulating layer, and a pixel electrode. The insulating layer is located on the common electrode. The pixel electrode is located on the insulating layer and is electrically connected to the active device. The pixel electrode includes an edge strip electrode and a plurality of extension electrodes. The extension electrodes respectively extend from the edge strip electrode toward the signal line. The light blocking pattern layer is located between two adjacent pixel units, and the light blocking pattern layer and the signal line overlap with each other.

17 Claims, 9 Drawing Sheets

(56) References Cited

U.S. PATENT DOCUMENTS

2016/0026050 A1    1/2016   Lin et al.
2018/0120617 A1*   5/2018   Tago ..................... B01F 1/0033

FOREIGN PATENT DOCUMENTS

TW       I521272     2/2016
TW       I542932     7/2016

\* cited by examiner

PIXEL STRUCTURE

CROSS-REFERENCE TO RELATED APPLICATION

This application claims the priority benefit of Taiwan application serial no. 106132759, filed on Sep. 25, 2017. The entirety of the above-mentioned patent application is hereby incorporated by reference herein and made a part of this specification.

BACKGROUND OF THE INVENTION

Field of the Invention

The invention relates to a pixel structure, particularly to a pixel structure conducive to alleviating a color mixing problem that occurs at side viewing angles.

Description of Related Art

Liquid crystal display panels having superior characteristics such as good space utilization, low power consumption and radiation free have gradually become the mainstream products in the market. To achieve better display quality of liquid crystal display panels, a variety of wide viewing angle liquid crystal display panels have been developed and commercially available, and examples thereof include in-plane switching (IPS) liquid crystal display panels, fringe field switching (FFS) liquid crystal display panels, multi-domain vertical alignment (MVA) liquid crystal display panels and so on.

FFS liquid crystal display panels, for example, have advantages and characteristics such as wide viewing angle and low color shift. However, in a conventional FFS liquid crystal display panel, due to a fringe field formed between each pixel electrode and its neighboring pixel electrodes, light transmittance may vary with the viewing angle or light leakage may occur. That is, brightness displayed by the FFS liquid crystal display panel may differ between when a user looks at a display screen from the front and when the user looks at the display screen from a side, or the display screen may have a color mixing problem or the like. Therefore, it has been a goal of researchers and developers to alleviate the color mixing problem of FFS liquid crystal display panels while maintaining good transmittance so as to achieve better display quality of FFS liquid crystal display panels.

SUMMARY OF THE INVENTION

The invention provides a pixel structure capable of alleviating a color mixing problem of the pixel structure while maintaining good transmittance.

The pixel structure of the invention includes a substrate, a first signal line, a first pixel unit, a second pixel unit and a first light blocking pattern layer. The first signal line is disposed on the substrate and has a first side and a second side. The first pixel unit is disposed on the first side of the first signal line. The first pixel unit includes a first active device, a first common electrode, a first insulating layer and a first pixel electrode. The first insulating layer is located on the first common electrode. The first pixel electrode is located on the first insulating layer and is electrically connected to the first active device. The first pixel electrode includes a first edge strip electrode and a plurality of first extension electrodes, wherein the first extension electrodes respectively extend from the first edge strip electrode toward the first signal line. The second pixel unit is disposed on the second side of the first signal line. The second pixel unit includes a second active device, a second common electrode, a second insulating layer and a second pixel electrode. The second insulating layer is located on the second common electrode. The second pixel electrode is located on the second insulating layer and is electrically connected to the second active device. The second pixel electrode includes a second edge strip electrode and a plurality of second extension electrodes, wherein the second extension electrodes respectively extend from the second edge strip electrode toward the first signal line. The first light blocking pattern layer is located between the first pixel unit and the second pixel unit, and the first light blocking pattern layer and the first signal line overlap with each other.

Based on the above, in the pixel structure proposed in the invention, the first pixel unit includes the first edge strip electrode and the plurality of first extension electrodes, the second pixel unit includes the second edge strip electrode and the plurality of second extension electrodes, and the first light blocking pattern layer is located between the first pixel unit and the second pixel unit, wherein the first extension electrode and the second extension electrode form a fringe field having a different direction. In this way, not only a color mixing problem of the pixel structure can be alleviated, but also good transmittance can be maintained.

To make the above features and advantages of the invention more comprehensible, several embodiments accompanied with drawings are described in detail as follows.

DETAILED DESCRIPTION OF DISCLOSED EMBODIMENTS

Figure 1:
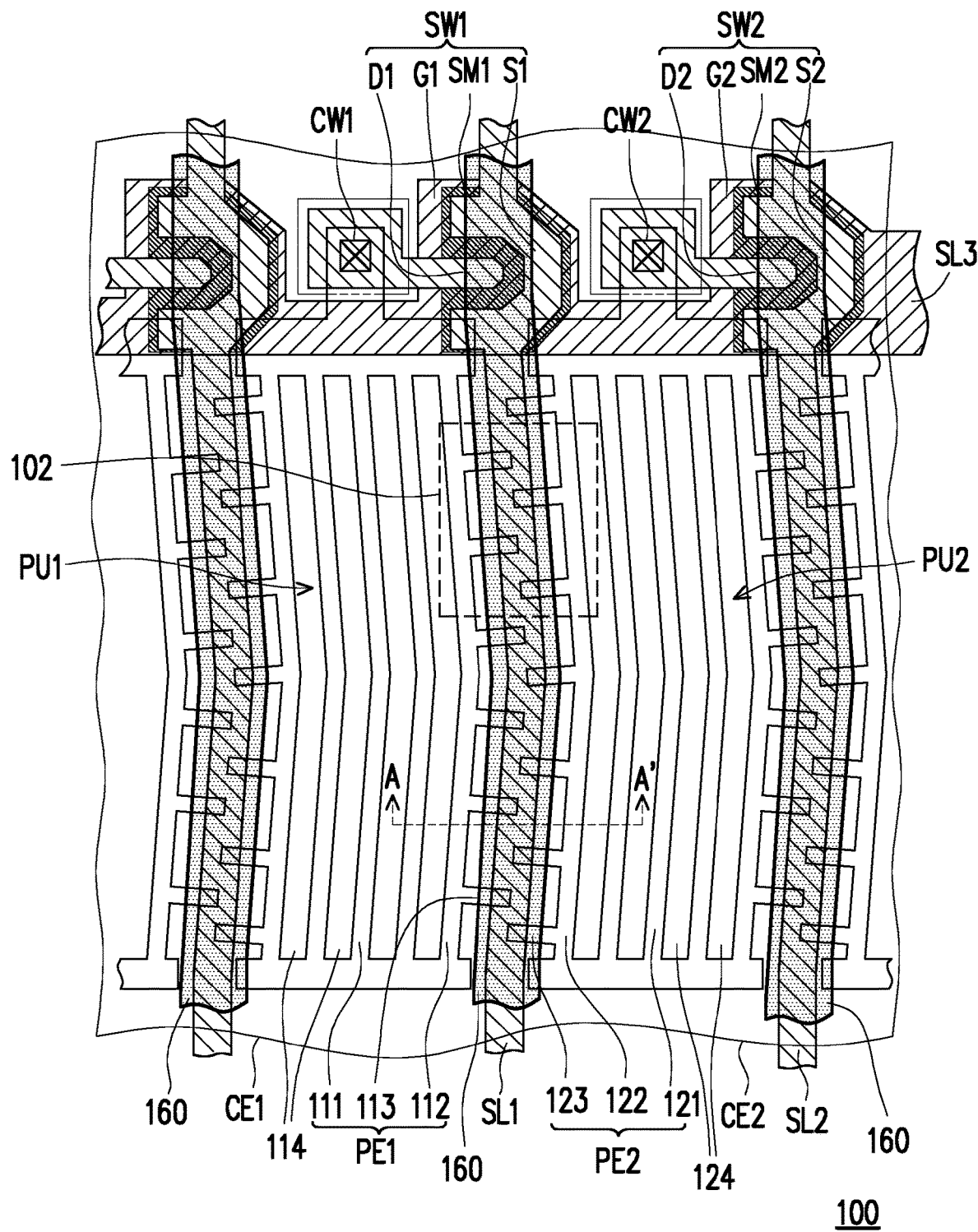
FIG. 1 is a schematic top view of a pixel structure according to an embodiment of the invention.

In the accompanying drawings, thicknesses of layers, films, panels, regions and so on are exaggerated for clarity. Throughout the specification, the same reference numerals denote the same elements. It will be understood that when an element such as a layer, film, region or substrate is referred to as being "on" or "connected to" another element, it can be directly on or connected to the other element, or intervening elements may also be present. In contrast, when an element is referred to as being "directly on" or "directly connected to" another element, there are no intervening elements present. As used herein, the term "connected" may refer to physically connected and/or electrically connected (coupled), and intervening elements may be present in an electrical connection (coupling).

The term "about," "roughly," "approximately" or "substantially" as used herein is inclusive of the stated value and means within an acceptable range of deviation for the particular value as determined by persons of ordinary skill in the art, considering the measurement in question and the error associated with measurement of the particular quantity (i.e., the limitations of the measurement system). For example, "about" may mean within one or more standard deviations, or within ±30%, ±20%, ±10%, ±5% of the stated value. Moreover, a relatively acceptable range of deviation or standard deviation may be chosen for the term "about," "approximately" or "substantially" as used herein based on optical properties, etching properties or other properties, instead of applying one standard deviation across all the properties.

Unless otherwise defined, all terms (including technical and scientific terms) used herein have the same meaning as commonly understood by persons of ordinary skill in the art. It will be further understood that terms, such as those defined in commonly used dictionaries, should be interpreted as having a meaning that is consistent with their meaning in the context of the relevant art and the invention and will not be interpreted in an idealized or overly formal sense unless expressly so defined herein.

Figure 2:
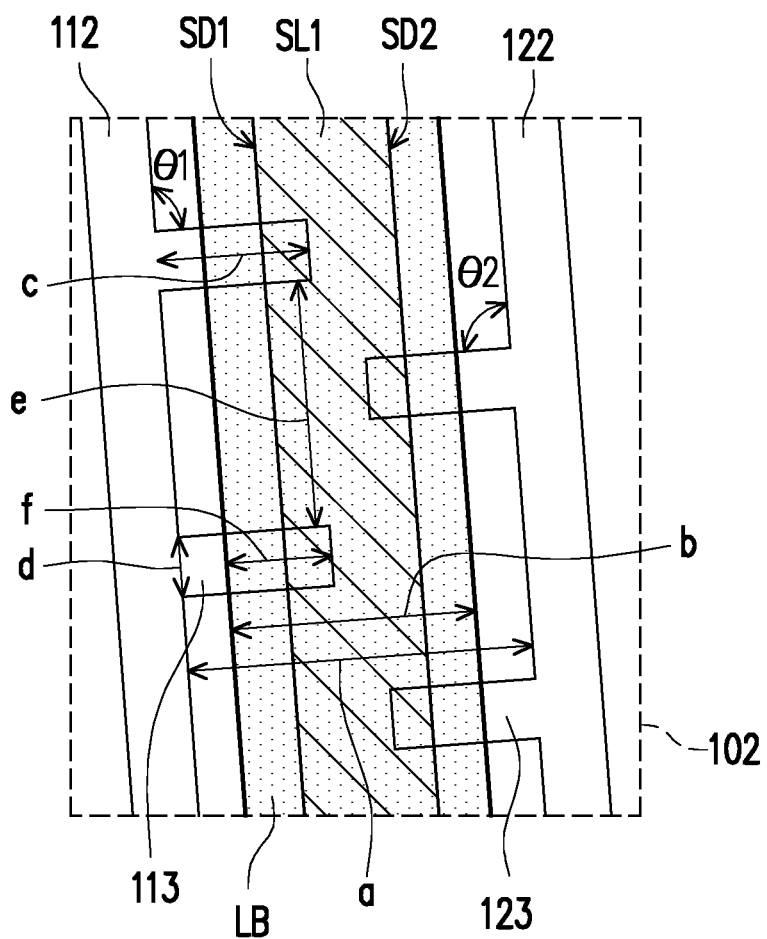
FIG. 2 is an enlarged view of a region 102 in FIG. 1.

FIG. 1 is a schematic top view of a pixel structure according to an embodiment of the invention. FIG. 2 is an enlarged view of a region 102 in FIG. 1. For clear illustration and ease of explanation, some layers are omitted from FIG. 1 and FIG. 2. Hereinafter, an implementation manner of the pixel structure according to an embodiment of the invention will be described in detail with reference to FIG. 1 to FIG. 2.

A pixel structure 100 includes a first substrate 11 (illustrated in FIG. 3), a first signal line SL1, a second signal line SL2, a third signal line SL3, a first pixel unit PU1, a second pixel unit PU2 and a first light blocking pattern layer 160. The first signal line SL1 and the second signal line SL2 are disposed on the first substrate 11. A material of the first substrate 11 may be glass, quartz, an organic polymer or other suitable material. However, the invention is not limited thereto.

The first signal line SL1 has a first side SD1 and a second side SD2 opposing each other, and an extension direction of the second signal line SL2 is roughly the same as an extension direction of the first signal line SL1. The third signal line SL3 crosses over the first signal line SL1 and the second signal line SL2. In other words, an extension direction of the third signal line SL3 is different from the extension directions of the first signal line SL1 and the second signal line SL2. In the present embodiment, the first signal line SL1 and the second signal line SL2 may be different data lines, while the third signal line SL3 may be a scan line. However, the invention is not limited thereto.

The first pixel unit PU1 is disposed on the first side SD1 of the first signal line SL1. The first pixel unit PU1 includes a first active device SW1, a first common electrode CE1, a first insulating layer 130 (illustrated in FIG. 3) and a first pixel electrode PE1. The first insulating layer 130 is located on the first common electrode CE1. The first pixel electrode PE1 is located on the first insulating layer 130 and is electrically connected to the first active device SW1.

The first active device SW1 is, for example, a thin film transistor (TFT), including a first gate G1, a first source S1, a first drain D1 and a first channel layer SM1. The first channel layer SM1 is located above the first gate G1, and the first channel layer SM1 and the first gate G1 may have a gate insulating layer 132 therebetween. The first source S1 and the first drain D1 are located above the first channel layer SM1. In other words, the explanation provides an example where the first active device SW1 is a bottom gate TFT. However, the invention is not limited thereto. In other implementation manners, the first active device SW1 may be a top gate TFT or other suitable TFT.

In the present embodiment, the first source S1 is electrically connected to the first signal line SL1, and the first gate G1 is electrically connected to the third signal line SL3. However, the invention is not limited thereto.

The pixel structure 100 may include a planar layer 150. The planar layer 150 covers the first active device SW1, the first signal line SL1 and the third signal line SL3, and may enable the first common electrode CE1, the first pixel electrode PE1 and the other layers or elements that are subsequently formed on the planar layer 150 to have better flatness. A material of the planar layer 150 may include an organic material, an inorganic material (e.g., silicon oxide, silicon nitride, silicon oxynitride, other suitable material or a stacked layer of at least two of the above materials), other suitable transparent dielectric material or a combination of the above.

The first common electrode CE1 is located on the planar layer 150. A material of the first common electrode CE1 includes a metal oxide or other suitable transparent conductive material, such as an indium tin oxide (ITO), an indium zinc oxide (IZO), an aluminum tin oxide (ATO), an aluminum zinc oxide (AZO), or other suitable oxide, or a stacked layer of at least two of the above.

The first insulating layer 130 is located on the first common electrode CE1. A material of the first insulating layer 130 may include an organic material, an inorganic material (e.g., silicon oxide, silicon nitride, silicon oxynitride, other suitable material or a stacked layer of at least two of the above materials), other suitable transparent dielectric material or a combination of the above.

The first pixel electrode PE1 is located on the first insulating layer 130, and the first pixel electrode PE1 and the first drain D1 are electrically connected to each other via a first contact window CW1. A material of the first pixel electrode PE1 includes a metal oxide or other suitable transparent conductive material, such as an indium tin oxide (ITO), an indium zinc oxide (IZO), an aluminum tin oxide (ATO), an aluminum zinc oxide (AZO), or other suitable oxide, or a stacked layer of at least two of the above.

In the present embodiment, the first pixel electrode PE1 includes a plurality of first pixel strip electrodes 111, a first edge strip electrode 112 and a plurality of first extension electrodes 113. The first edge strip electrode 112 is disposed between the first pixel strip electrode 111 and the first signal line SL1. The first edge strip electrode 112 and the first pixel strip electrode 111 have a slit 114 therebetween, and any two adjacent first pixel strip electrodes 111 have a slit 114 therebetween. In the present embodiment, the first edge strip electrode 112 and the first pixel strip electrode 111 may form an about "«" shaped grid electrode pattern, and neither the first edge strip electrode 112 nor the first pixel strip electrode 111 is parallel to the first signal line SL1. However, the invention is not limited thereto. In other embodiments, the first edge strip electrode 112 and the first pixel strip electrode 111 may be arranged in other electrode patterns.

The plurality of first extension electrodes 113 are located between the first edge strip electrode 112 and the first signal line SL1, and each of the first extension electrodes 113 extends from the first edge strip electrode 112 toward the first signal line SL1. In other words, the first edge strip electrode 112 and the plurality of first extension electrodes 113 may be the same conductive pattern, and each of the first extension electrodes 113 has a first angle $\theta 1$ with respect to the first edge strip electrode 112. In the present embodiment, the first angle $\theta 1$ may be a right angle, i.e., each of the first extension electrodes 113 and the first edge strip electrode 112 may form an about "T" shaped electrode pattern. However, the invention is not limited thereto. In other embodiments, the first angle $\theta 1$ may also be a non-right angle.

The second pixel unit PU2 is disposed on the second side SD2 of the first signal line SL1. The second pixel unit PU2 includes a second active device SW2, a second common electrode CE2, a second insulating layer 140 (illustrated in FIG. 3) and a second pixel electrode PE2. The second insulating layer 140 is located on the second common electrode CE2. The second pixel electrode PE2 is located on the second insulating layer 140 and is electrically connected to the second active device SW2.

The second active device SW2 is, for example, a TFT, including a second gate G2, a second source S2, a second drain D2 and a second channel layer SM2. In terms of structure, the second active device SW2 in the present embodiment may be a bottom gate TFT similar to the first active device SW1, and details thereof are thus not repeated herein.

In the present embodiment, the second source S2 is electrically connected to the second signal line SL2, and the second gate G2 is electrically connected to the third signal line SL3. However, the invention is not limited thereto.

The planar layer 150 covers the second active device SW2, the second signal line SL2 and the third signal line SL3, and may enable the second common electrode CE2, the second pixel electrode PE2 and the other layers or elements that are subsequently formed on the planar layer 150 to have better flatness.

The second common electrode CE2 is located on the planar layer 150. A material of the second common electrode CE2 includes a metal oxide or other suitable transparent conductive material, such as an indium tin oxide (ITO), an indium zinc oxide (IZO), an aluminum tin oxide (ATO), an aluminum zinc oxide (AZO), or other suitable oxide, or a stacked layer of at least two of the above. In the present embodiment, the first common electrode CE1 and the second common electrode CE2 may be substantially connected to each other, so that the first common electrode CE1 and the second common electrode CE2 are electrically connected to each other. In other embodiments, the first common electrode CE1 and the second common electrode CE2 may be substantially separated from each other, and the first common electrode CE1 and the second common electrode CE2 may be electrically connected to each other via other conductive elements.

The second insulating layer 140 is located on the second common electrode CE2. A material of the second insulating layer 140 may be the same as or similar to the material of the first insulating layer 130. In the present embodiment, the first insulating layer 130 and the second insulating layer 140 may be substantially connected to each other, i.e., the first insulating layer 130 and the second insulating layer 140 may be the same patterned insulating layer. However, the invention is not limited thereto.

The second pixel electrode PE2 is located on the second insulating layer 140, and the second pixel electrode PE2 and the second drain D2 are electrically connected to each other via a second contact window CW2. A material of the second pixel electrode PE2 includes a metal oxide or other suitable transparent conductive material, such as an indium tin oxide (ITO), an indium zinc oxide (IZO), an aluminum tin oxide (ATO), an aluminum zinc oxide (AZO), or other suitable oxide, or a stacked layer of at least two of the above. In terms of structure, the second pixel electrode PE2 is the same as or similar to the first pixel electrode PE1. However, the invention is not limited thereto.

In the present embodiment, the second pixel electrode PE2 includes a plurality of second pixel strip electrodes 121, a second edge strip electrode 122 and a plurality of second extension electrodes 123. The second edge strip electrode 122 is disposed between the second pixel strip electrode 121 and the first signal line SL1. The second edge strip electrode 122 and the second pixel strip electrode 121 have a slit 124 therebetween, and any two adjacent second pixel strip electrodes 121 have a slit 124 therebetween. In the present embodiment, the second edge strip electrode 122 and the second pixel strip electrode 121 may form an about "«" shaped grid electrode pattern, and neither the second edge strip electrode 122 nor the second pixel strip electrode 121 is parallel to the first signal line SL1. However, the invention is not limited thereto. In other embodiments, the second edge strip electrode 122 and the second pixel strip electrode 121 may be arranged in other electrode patterns.

The plurality of second extension electrodes 123 are located between the second edge strip electrode 122 and the first signal line SL1, and each of the second extension electrodes 123 extends from the second edge strip electrode 122 toward the first signal line SL1. In other words, the second edge strip electrode 122 and the plurality of second extension electrodes 123 are the same conductive pattern, and each of the second extension electrodes 123 has a second angle $\theta 2$ with respect to the second edge strip electrode 122. In the present embodiment, the second angle θ2 may be a right angle, i.e., each of the second extension electrodes 123 and the second edge strip electrode 122 may form an about "T" shaped electrode pattern. However, the invention is not limited thereto. In other embodiments, the second angle θ2 may also be a non-right angle.

The first light blocking pattern layer 160 is located between the first pixel unit PU1 and the second pixel unit PU2, and the first light blocking pattern layer 160 and the first signal line SL1 overlap with each other in a vertical projection direction of the first substrate 11. In the present embodiment, the first light blocking pattern layer 160 may be a conductive metal layer made of a conductive material such as a metal or a metal alloy. However, the invention is not limited thereto. In other embodiments, the material of the first light blocking pattern layer 160 may be a dielectric material capable of absorbing visible light, such as a carbonaceous material, black resin or the like. In the present embodiment, a width of the first light blocking pattern layer 160 is greater than a width of the first signal line SL1 and/or the second signal line SL2. However, the invention is not limited thereto.

In the present embodiment, the first light blocking pattern layer 160 is located above the first common electrode CE1 and the second common electrode CE2, but the invention is not limited thereto; in other embodiments, the first common electrode CE1 and the second common electrode CE2 may be located above the first light blocking pattern layer 160. In addition, in the present embodiment, the first light blocking pattern layer 160 is electrically connected to the first common electrode CE1 and the second common electrode CE2; but the invention is not limited thereto; in other embodiments, the first light blocking pattern layer 160 may be a dielectric material, or an insulating layer may be provided between the first light blocking pattern layer 160 and the first common electrode CE1 and between the first light blocking pattern layer 160 and the second common electrode CE2.

In some embodiments, the first edge strip electrode 112 and the second edge strip electrode 122 have a pixel pitch a therebetween, the first light blocking pattern layer 160 has a light blocking width b, and a ratio of the light blocking width b to the pixel pitch a is greater than or equal to about 0.5 and smaller than or equal to about 1.

In some embodiments, the first edge strip electrode 112 and the second edge strip electrode 122 have a pixel pitch a therebetween, each of the first extension electrodes 113 has an extension length c, and a ratio of the extension length c of each of the first extension electrodes 113 to the pixel pitch a is greater than or equal to about 0.13 and smaller than or equal to about 0.68. Preferably, the ratio of the extension length c of each of the first extension electrodes 113 to the pixel pitch a is greater than or equal to about 0.13 and smaller than or equal to about 0.23.

In some embodiments, each of the first extension electrodes 113 has an extension width d, and the extension width d of each of the first extension electrodes 113 is greater than 0 μm and smaller than or equal to about 7 Preferably, the extension width d of each of the first extension electrodes 113 is greater than or equal to about 1 μm and smaller than or equal to about 4.1 μm. In addition, the extension width d may have a tolerance of about 0.2 μm.

In some embodiments, the first extension electrodes 113 have an electrode spacing e between one another, each of the first extension electrodes 113 has an extension width d, and a ratio of the electrode spacing e to the extension width d is greater than or equal to about 2.6 and smaller than or equal to about 8.2. Preferably, the ratio of the electrode spacing e to the extension width d is greater than or equal to about 2.6 and smaller than or equal to about 3.3, or is greater than or equal to about 5.4 and smaller than or equal to about 8.2. In addition, the electrode spacing e may have a tolerance of about 0.4 μm, and the ratio of the electrode spacing e to the extension width d may have a corresponding error propagation value.

In some embodiments, each of the first extension electrodes 113 partially overlaps the first light blocking pattern layer 160 to define an overlapping width f, the first light blocking pattern layer 160 has a light blocking width b, and a ratio of the overlapping width f of each of the first extension electrodes 113 to the light blocking width b is smaller than or equal to about 0.8. In some embodiments, an edge of each of the first extension electrodes 113 is flush with an edge of the first light blocking pattern layer 160, and a value of the overlapping width f is about 0. In some embodiments, each of the first extension electrodes 113 does not overlap the first light blocking pattern layer 160, and a distance between an edge of each of the first extension electrodes 113 and an edge of the first light blocking pattern layer 160 may be represented by the overlapping width f having a negative value.

In some embodiments, a structure of the second pixel electrode PE2 is similar to a structure of the first pixel electrode PE1. That is, the overlapping width f may also be a width of a portion where each of the second extension electrodes 123 and the first light blocking pattern layer 160 partially overlap or a distance between an edge of each of the second extension electrodes 123 and an edge of the first light blocking pattern layer 160; the extension length c may also be a length of each of the second extension electrodes 123; the electrode spacing e may also be a spacing between each of the second extension electrodes 123; and/or the extension width d may also be a width of each of the second extension electrodes 123.

Figure 3:
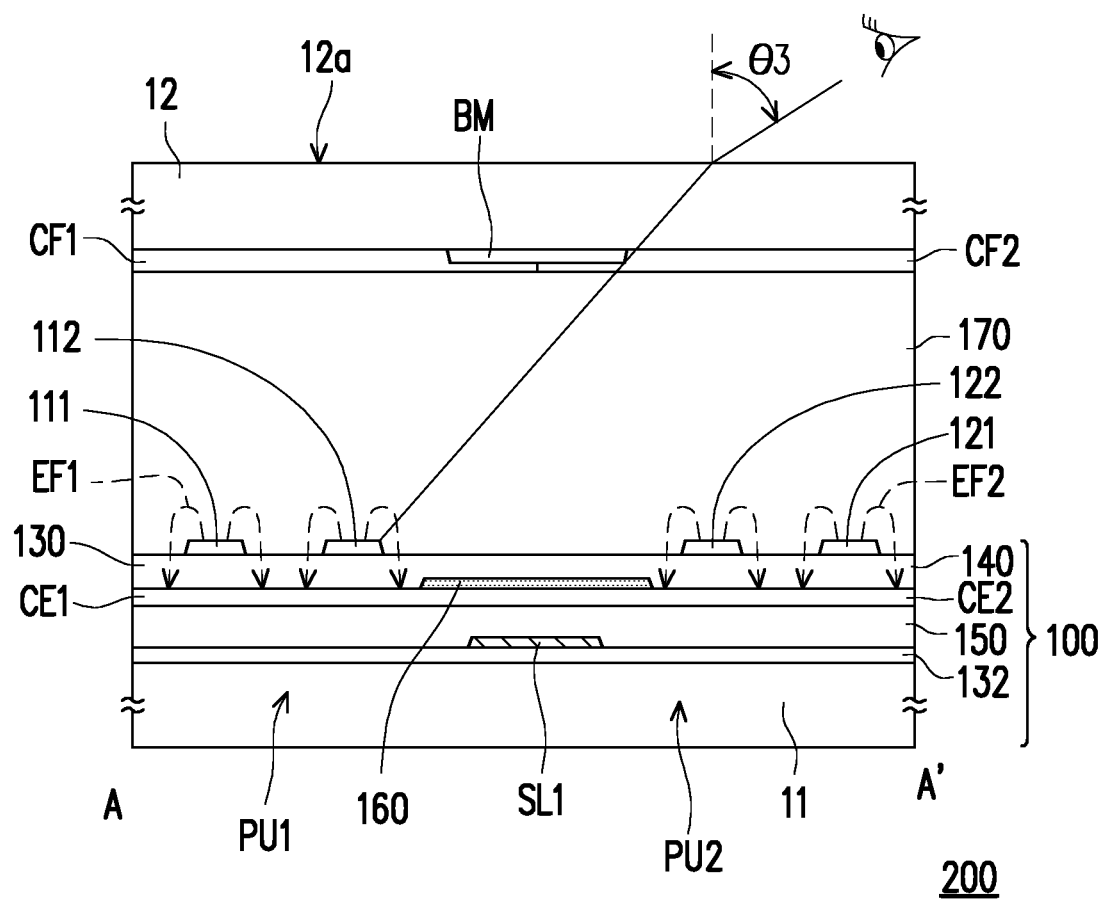
FIG. 3 is a schematic cross-sectional view of a display panel according to an embodiment of the invention.

The pixel structure 100 of the aforementioned embodiments is applicable to a display panel. In a fringe field switching (FFS) display panel, for example, the pixel structure 100 may be assembled with other elements to constitute a display panel 200 as shown in FIG. 3. However, the application manner of the pixel structure 100 is not limited in the invention.

Figure 4:
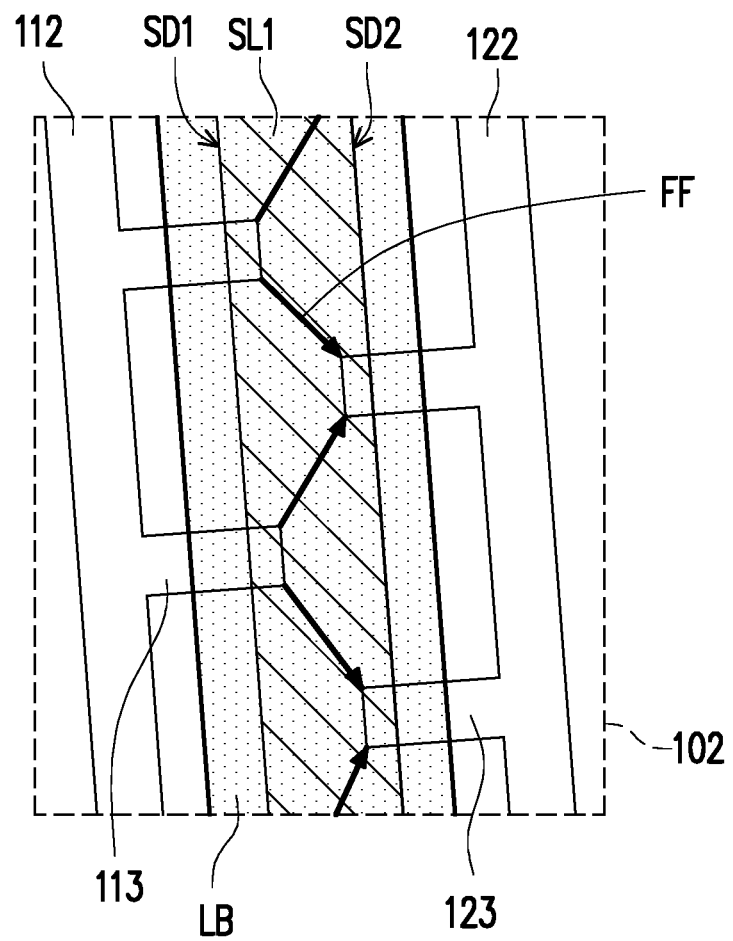
FIG. 4 is a schematic top view of a fringe field FF formed in the pixel structure according to an embodiment of the invention in the region 102 in FIG. 1.

FIG. 3 is a schematic cross-sectional view of a display panel according to an embodiment of the invention. The schematic cross-sectional view of the display panel in FIG. 3 may be illustrated corresponding to sectional line A-A' in the pixel structure in FIG. 1. FIG. 4 is a schematic top view of a fringe field FF formed in the pixel structure of the display panel according to an embodiment of the invention in the region 102 in FIG. 1. For clear illustration and ease of explanation, some layers are omitted from FIG. 3 and FIG. 4. It is worth noting that, the display panel in FIG. 3 may include the pixel structure of the embodiments of FIG. 1 to FIG. 2. The same or similar reference numbers denote the same or similar members. Therefore, the members that have been explained with reference to FIG. 1 to FIG. 2 will not be described again in detail herein.

In the present embodiment, the pixel structure 100 may constitute the display panel 200 with a second substrate 12, a display medium layer 170, a first color filter pattern CF1, a second color filter pattern CF2 and a second light blocking pattern layer BM. The display medium layer 170, the first color filter pattern CF1, the second color filter pattern CF2 and the second light blocking pattern layer BM are located between the second substrate 12 and the pixel structure 100.

A material of the second substrate 12 may include glass, quartz, an organic polymer or other similar light transmissive material.

In the present embodiment, the second light blocking pattern layer BM is located between the second substrate 12 and a plurality of color filter patterns CF1 and CF2. However, the invention is not limited thereto. In other embodiments, the plurality of color filter patterns CF1 and CF2 may be located between the second substrate 12 and the second light blocking pattern layer BM.

The display medium layer 170 is located between the pixel structure 100 and the second substrate 12. The display medium layer 170 includes a plurality of liquid crystal molecules (not illustrated). However, the invention is not limited thereto. In other embodiments, the display medium layer 170 may also include an electrophoretic display medium or other applicable medium. In addition, the liquid crystal molecules in the embodiments of the invention are exemplified by liquid crystal molecules that can be rotated or switched by an electric field. However, the invention is not limited thereto.

In a normal direction of a surface 12a of the second substrate 12, the first pixel unit PU1 of the pixel structure 100 overlaps the first color filter pattern CF1, and the second pixel unit PU2 of the pixel structure 100 overlaps the second color filter pattern CF2. In other words, the first color filter pattern CF1 is disposed corresponding to the first pixel unit PU1, and the second color filter pattern CF2 is disposed corresponding to the second pixel unit PU2.

In operation of the display panel 200, the first common electrode CE1 is, for example, electrically connected to a common voltage source, so as to apply a common voltage (Vcom) to the first common electrode CE1 of the first pixel unit PU1. The first pixel electrode PE1 receives a corresponding voltage transmitted from the first drain D1. Accordingly, in the first pixel unit PU1, a first electric field EF1 is formed between the first pixel electrode PE1 and the first common electrode CE1. When the pixel structure 100 is applied in the display panel 200, the first electric field EF1 formed in the first pixel unit PU1 drives the liquid crystal molecules above the first pixel unit PU1 to deflect to different extents so as to perform a display function. It is worth mentioning that, since the first edge strip electrode 112 and the first pixel strip electrode 111 of the first pixel electrode PE1 may form an about "«" shaped electrode pattern, the design of such first pixel electrode PE1 may divide the display medium layer 170 above into a plurality of alignment domains, so that the display panel using this pixel structure 100 can alleviate the color mixing problem while maintaining good transmittance, and can also widen the viewing angle.

The second common electrode CE2 is, for example, electrically connected to a common voltage source, so as to apply a common voltage to the second common electrode CE2 of the second pixel unit PU2. The second pixel electrode PE2 receives a corresponding voltage transmitted from the second drain D2. Accordingly, in the second pixel unit PU2, a second electric field EF2 is formed between the second pixel electrode PE2 and the second common electrode CE2. When the pixel structure 100 is applied in the display panel 200, the second electric field EF2 formed in the second pixel unit PU2 drives the liquid crystal molecules above the second pixel unit PU2 to deflect to different extents so as to perform the display function. In brief, the second pixel unit PU2 is similar to the first pixel unit PU1 in application.

In addition, the fringe field FF as shown in FIG. 4 may further be formed between the first pixel electrode PE1 and the second pixel electrode PE2. It is worth noting that, in FIG. 4, the direction of the fringe field FF is from the first extension electrode 113 and toward the second extension electrode 123. However, the invention is not limited thereto. In other embodiments, the direction of the fringe field FF may correspond to charge distribution between the first extension electrode 113 and the second extension electrode 123.

For example, when the first pixel electrode PE1 receives the corresponding voltage transmitted from the first drain D1, and the second pixel electrode PE2 does not receive the corresponding voltage transmitted from the second drain D2, since a voltage value of the first pixel electrode PE1 is different from a voltage value of the second pixel electrode PE2, an electric field is formed between the first pixel electrode PE1 and the second pixel electrode PE2. In brief, when the voltage value of the first pixel electrode PE1 is different from the voltage value of the second pixel electrode PE2, an electric field is formed between the first pixel electrode PE1 and the second pixel electrode PE2. In this way, when the pixel structure 100 is applied in the display panel 200, the electric field formed between the first pixel electrode PE1 and the second pixel electrode PE2 drives the liquid crystal molecules between the first pixel unit PU1 and the second pixel unit PU2 to deflect to different extents. At this moment, if light passes through the liquid crystal molecules between the first pixel unit PU1 and the second pixel unit PU2, light leakage may occur, resulting in the color mixing problem or the like of the display screen.

In the present embodiment, the first extension electrodes 113 respectively extend from the first edge strip electrode 112 toward the first signal line SL1, the second extension electrodes 123 respectively extend from the second edge strip electrode 122 toward the first signal line SL1, and the first extension electrodes 113 and the second extension electrodes 123 are disposed alternately. In the present embodiment, by the arrangement of the first extension electrode 113 and/or the second extension electrode 123, the fringe field FF formed between the first pixel electrode PE1 and the second pixel electrode PE2 can have a direction different from a direction of the first electric field EF1 and/or the second electric field EF2. Based on the above, by the arrangement of the first extension electrode 113 and/or the second extension electrode 123 in the present embodiment, the deflection direction of the liquid crystal molecules between the first pixel unit PU1 and the second pixel unit PU2 can be made different from the deflection direction of the liquid crystal molecules on the first pixel unit PU1 and/or the second pixel unit PU2. By the fringe field FF formed between the first extension electrode 113 and the second extension electrode 123, the liquid crystal molecules can extend along a rubbing direction, thereby reducing the occurrence of light leakage. In addition, the first pixel unit PU1 and the second pixel unit PU2 has the first light blocking pattern layer 160 therebetween. Accordingly, the light can be prevented from passing through the liquid crystal molecules between the first pixel unit PU1 and the second pixel unit PU2, so as to reduce light leakage and to thus alleviate the color mixing problem of the display screen, while good transmittance can be maintained.

TEST EXAMPLES

To prove that the pixel structure of the invention is capable of alleviating problems such as insufficient color saturation and color shift of the display screen, the following test examples are particularly described. However, these test examples should not be interpreted as limiting the scope of the invention in any sense.

Generally, in a bright environment, the human eye is relatively sensitive to yellow green light having an intermediate wavelength (about 555 nm). The yellow green light appears to be the brightest to the human eye. The relative sensitivity of the human eye gradually decreases to approximately 0 toward both sides of the visible spectrum, and this diagram is called a visibility curve. That is, the human eye is more sensitive to a mixed light of red light and green light than to a mixed light of red light and blue light and/or a mixed light of green light and blue light. In other words, under the same pixel structure, if color mixing caused by the mixed light of red light and green light is acceptable to the human eye, according to human vision, the mixed light of red light and blue light or the mixed light of green light and blue light is also acceptable to the human eye. Therefore, in general human factors experiments relating to color mixing, red light and green light are mostly used as the experiment conditions.

Referring to FIG. 1 to FIG. 12 together, in each of the following test examples, a ratio of green light (wavelength: about 550 nm) mixed in red light (wavelength: about 650 nm) in the pixel structure of the aforementioned embodiments under different conditions was calculated using simulation software. In detail, in each of the following test examples, the simulation conditions were as follows. The first color filter pattern CF1 was a red color filter pattern (wavelength of light that can be transmitted therethrough: about 650 nm). The first pixel electrode PE1 received the corresponding voltage transmitted from the first drain D1, so that the liquid crystal molecules overlapping the first pixel unit PU1 deflected in a corresponding direction. The second color filter pattern CF2 was a green color filter pattern (wavelength of light that can be transmitted therethrough: about 550 nm), and the second pixel electrode PE2 did not receive the corresponding voltage transmitted from the second drain D2, so that the liquid crystal molecules overlapping the second pixel unit PU2 deflected in an initial direction. The ratio of green light mixed in red light at different viewing angles θ3 in a direction from the second color filter pattern CF2 toward the first color filter pattern CF1 and parallel to the direction of sectional line A-A' in FIG. 1 (i.e., parallel to the extension direction of the third signal line SL3) was calculated. In the above, the ratio of green light mixed in red light may be a ratio (i.e., a luminous transmittance ratio R) between luminous transmittance through the second color filter pattern CF2 and luminous transmittance through the first color filter pattern CF1, which may be represented by formula (1):

$$R = \frac{Tr.(\theta, 550 \text{ nm})}{Tr.(\theta, 650 \text{ nm})} \quad (1)$$

In the formula, Tr·(θ,550 nm) represents the luminous transmittance through the second color filter pattern CF2 (which was a green color filter pattern in the test examples), and Tr·(θ,650 nm) represents the luminous transmittance through the first color filter pattern CF1 (which was a red color filter pattern in the test examples), wherein the viewing angle θ3 is an angle between an extension direction of a line of sight and the normal line of the surface 12a of the second substrate 12. According to the results of human factors experiments, when the luminous transmittance ratio R is smaller than or equal to about 1.409%, it means that the color mixing caused by mixed light in Gaussian distribution may be acceptable to 85% or more of human eyes. That is, 85% or more of human eyes cannot identify a color mixing state.

The following test examples explain the luminous transmittance ratio R (i.e., the numerical value represented by formula (1)) of the display panel including the pixel structure of the aforementioned embodiments at different viewing angles θ3, according to the pixel pitch a between the first edge strip electrode 112 and the second edge strip electrode 122, the light blocking width b of the first light blocking pattern layer 160, the extension length c of the first extension electrode 113, the extension width d of the first extension electrode 113, the electrode spacing e between each of the first extension electrodes 113, the overlapping width f between the first extension electrode 113 and the first light blocking pattern layer 160, or relationships therebetween.

Test Example 1

The present test example made a comparison of the luminous transmittance ratio R of the display panels including the pixel structures of different test examples under the architecture of the pixel structure 100 in terms of whether or not the first extension electrode 113 and the second extension electrode 123 were provided in the pixel structure and whether or not the first light blocking pattern layer 160 was provided in the pixel structure. Specifically, in the present test example, when the pixel structure included the first extension electrode 113 and the first light blocking pattern layer 160, the color mixing problem or the like of the display screen could be alleviated. The simulation results were as shown in Table 1 below.

TABLE 1

|     | Test Example 1-1 | Test Example 1-2 | Test Example 1-3 | Test Example 1-4 |
| --- | --- | --- | --- | --- |
| b/a | 0 | 0 | 60% | 60% |
| c/a | 0 | 40% | 40% | 13% |
| R   | 0.0207 | 0.0289 | 0.0073 | 0.0069 |

Referring to FIG. 2, FIG. 3 and Table 1 together, Table 1 lists comparison values of the luminous transmittance ratio R of the pixel structure at the viewing angle θ3 of about 60 degrees according to Test Example 1 of the invention. In detail, Table 1 lists the luminous transmittance ratio R corresponding to the display screen in the case (i.e., Test Example 1-1) where the pixel structure included neither the first extension electrode 113 nor the first light blocking pattern layer 160, the case (i.e., Test Example 1-2) where the pixel structure included the first extension electrode 113 and did not include the first light blocking pattern layer 160, and the cases (i.e., Test Examples 1-3 and 1-4) where the pixel structure included the first light blocking pattern layer 160 and the extension length c of the first extension electrode 113 had different values.

Specifically, in the present test example, when the pixel structure included the first extension electrode 113/the second extension electrode 123 and the first light blocking pattern layer 160, the color mixing problem or the like of the display screen could be alleviated.

Test Example 2

The present test example made a comparison of the luminous transmittance ratio R of the display panels including the pixel structures of the aforementioned embodiments in terms of the ratio of the light blocking width b of the first light blocking pattern layer 160 to the pixel pitch a between the first edge strip electrode 112 and the second edge strip electrode 122. In the pixel structure of Test Example 2, the ratio (i.e., the later-described mathematical expression (3)) of the extension length c of the first extension electrode 113 to the pixel pitch a between the first edge strip electrode 112 and the second edge strip electrode 122 was about 13%, wherein the aforementioned ratio of the light blocking width b of the first light blocking pattern layer 160 to the pixel pitch a between the first edge strip electrode 112 and the second edge strip electrode 122 may be represented by mathematical expression (2):

$$\frac{b}{a} \quad (2)$$

Figure 5:
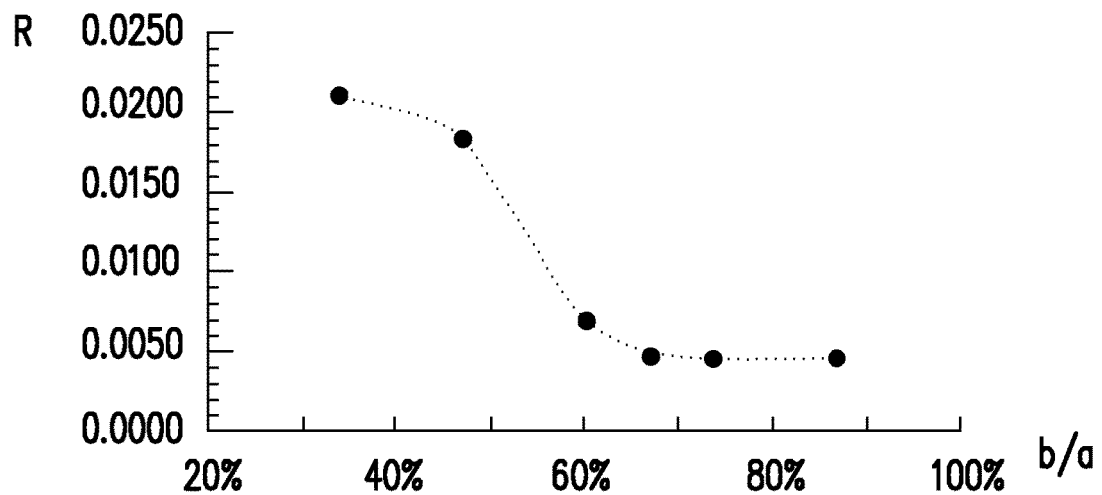
FIG. 5 illustrates a relationship between the luminous transmittance ratio and the ratio of the light blocking width to the pixel pitch of the pixel structure at a viewing angle of about 60 degrees according to Test Example 2 of the invention.

Referring to FIG. 2, FIG. 3 and FIG. 5 together, FIG. 5 illustrates a relationship between the luminous transmittance ratio R and the ratio of the light blocking width b to the pixel pitch a of the pixel structure at the viewing angle θ3 of about 60 degrees according to Test Example 2 of the invention. In detail, in the relationship diagram of FIG. 5, the vertical axis indicates the luminous transmittance ratio R, and the horizontal axis indicates the numerical value represented by mathematical expression (2). Specifically, in the present test example, when the first light blocking pattern layer 160 of the pixel structure had the light blocking width b, the first edge strip electrode 112 and the second edge strip electrode 122 had the pixel pitch a therebetween, and the ratio of the light blocking width b to the pixel pitch a was greater than or equal to about 0.5, the color mixing problem or the like of the display screen could be alleviated. In addition, when the ratio of the light blocking width b to the pixel pitch a was smaller than or equal to about 0.8, a reduction amount of transmittance at the front viewing angle could be made smaller than 4%, and thus the transmittance of the display panel could be maintained.

Test Example 3

The present test example made a comparison of the luminous transmittance ratio R of the display panels including the pixel structures of the aforementioned embodiments in terms of the ratio of the extension length c of the first extension electrode 113 to the pixel pitch a between the first edge strip electrode 112 and the second edge strip electrode 122. In the pixel structure of Test Example 3, the ratio (i.e., the aforementioned mathematical expression (2)) of the light blocking width b of the first light blocking pattern layer 160 to the pixel pitch a between the first edge strip electrode 112 and the second edge strip electrode 122 was about 60%, wherein the aforementioned ratio of the extension length c of the first extension electrode 113 to the pixel pitch a between the first edge strip electrode 112 and the second edge strip electrode 122 may be represented by mathematical expression (3):

$$\frac{c}{a} \quad (3)$$

Figure 6:
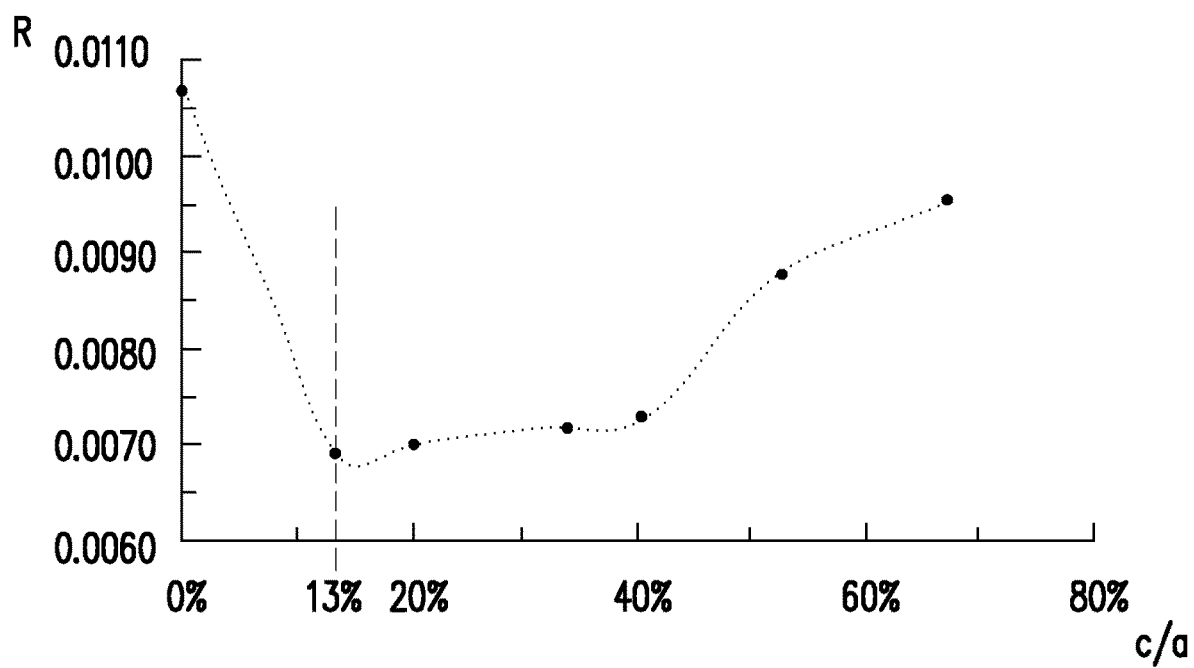
FIG. 6 illustrates a relationship between the luminous transmittance ratio and the ratio of the extension length to the pixel pitch of the pixel structure at a viewing angle of about 60 degrees according to Test Example 3 of the invention.
Figure 7:
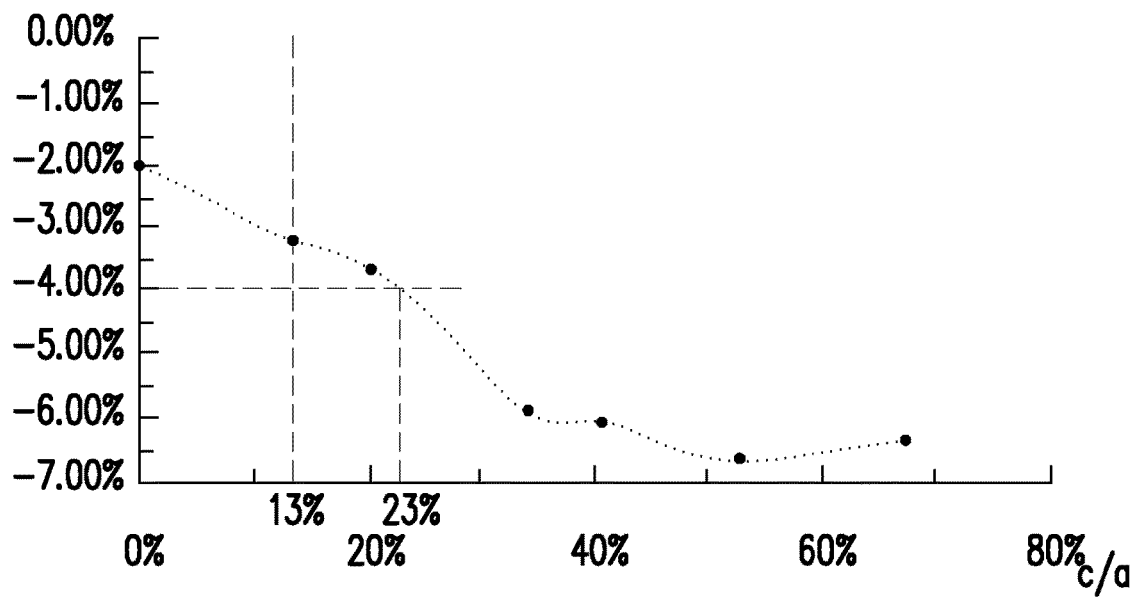
FIG. 7 illustrates a relationship between the reduction amount of luminous transmittance through a first color filter pattern and the ratio of the extension length to the pixel pitch of the pixel structure at a front viewing angle according to Test Example 3 of the invention.

Referring to FIG. 2, FIG. 3, FIG. 6 and FIG. 7 together, FIG. 6 illustrates a relationship between the luminous transmittance ratio R and the ratio of the extension length c to the pixel pitch a of the pixel structure at the viewing angle θ3 of about 60 degrees according to Test Example 3 of the invention, and FIG. 7 illustrates a relationship between the reduction amount of luminous transmittance through the first color filter pattern CF1 (which was a red color filter pattern in the test example) and the ratio of the extension length c to the pixel pitch a of the pixel structure at the front viewing angle (θ3 of about 0 degree) according to Test Example 3 of the invention. In detail, in the relationship diagram of FIG. 6, the vertical axis indicates the luminous transmittance ratio R, and the horizontal axis indicates the numerical value represented by mathematical expression (3). In the relationship diagram of FIG. 7, the vertical axis indicates the proportion of reduction in luminous transmittance through the first color filter pattern CF1 (which was a red color filter pattern in the test example), and the horizontal axis indicates the numerical value represented by mathematical expression (3), wherein the reduction amount of luminous transmittance was based on the aforementioned Test Example 1-1.

Specifically, in the present test example, when the first light blocking pattern layer 113 of the pixel structure had the extension length c, the first edge strip electrode 112 and the second edge strip electrode 122 had the pixel pitch a therebetween, and the ratio of the extension length c to the pixel pitch a was greater than or equal to about 0.13 and smaller than or equal to about 0.68, the color mixing problem or the like of the display screen could be alleviated. In addition, in further view of the luminous transmittance through the first color filter pattern CF1 (which was a red color filter pattern in the test example) or in further view of front view transmittance, the ratio of the extension length c to the pixel pitch a was greater than or equal to about 0.13 and smaller than or equal to about 0.23.

Test Example 4

The present test example made a comparison of the luminous transmittance ratio R of the display panels including the pixel structures of the aforementioned embodiments in terms of the extension width d of the first extension electrode 113. In the pixel structure of Test Example 4, the ratio (i.e., the aforementioned mathematical expression (2)) of the light blocking width b of the first light blocking pattern layer 160 to the pixel pitch a between the first edge strip electrode 112 and the second edge strip electrode 122 was about 60%, and the ratio (i.e., the aforementioned mathematical expression (3)) of the extension length c of the first extension electrode 113 to the pixel pitch a between the first edge strip electrode 112 and the second edge strip electrode 122 was about 13%.

Figure 8:
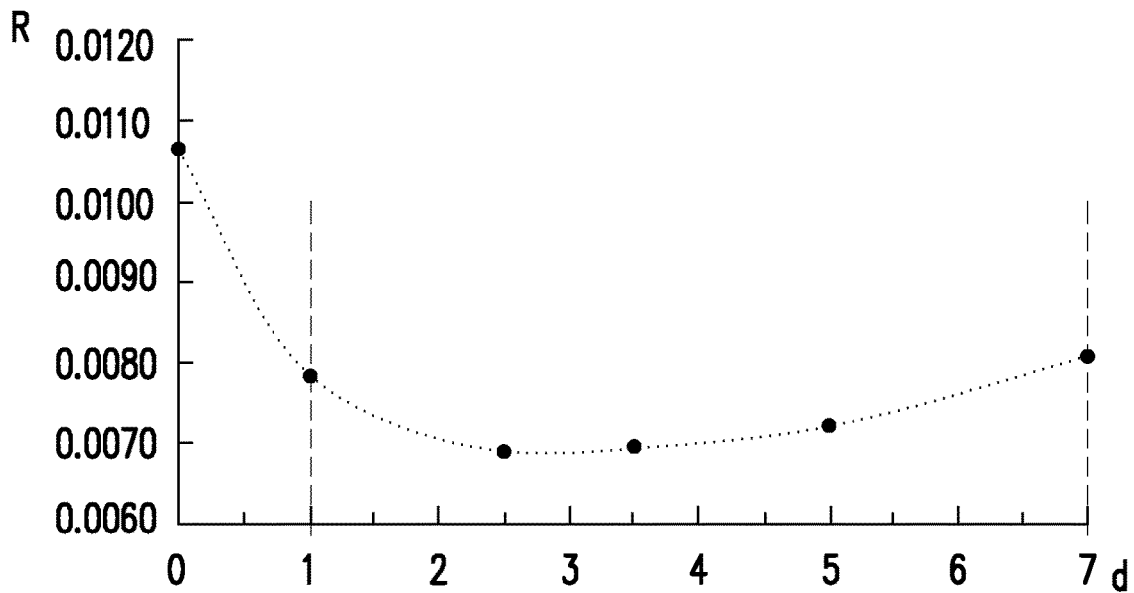
FIG. 8 illustrates a relationship between the luminous transmittance ratio and the extension width of the pixel structure at a viewing angle of about 60 degrees according to Test Example 4 of the invention.
Figure 9:
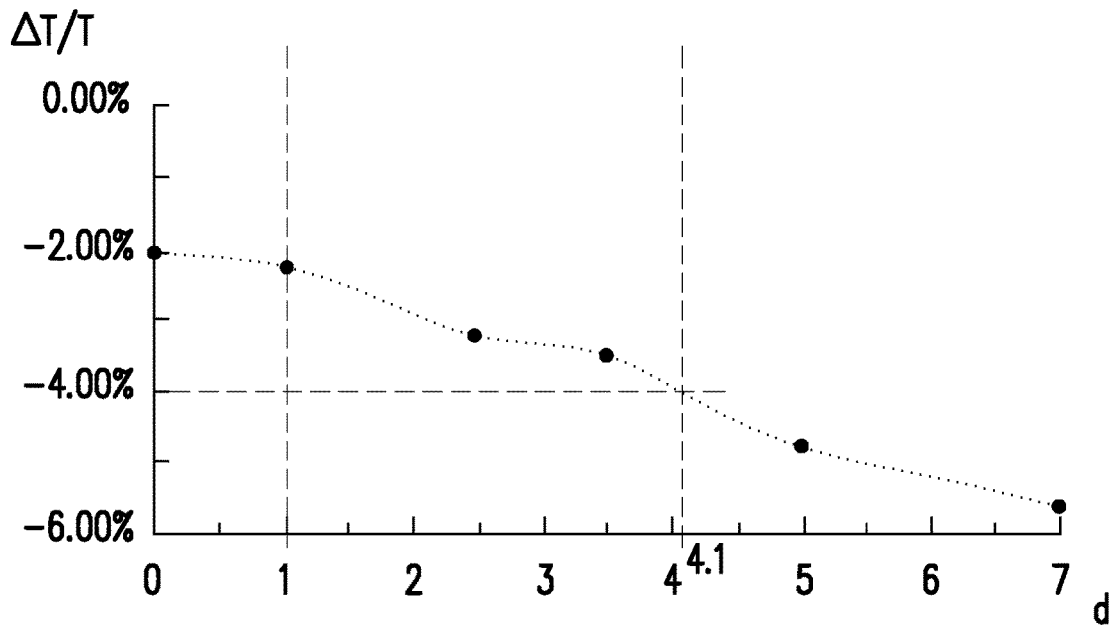
FIG. 9 illustrates a relationship between the reduction amount of luminous transmittance through a first color filter pattern and the ratio of the extension width of the pixel structure at a front viewing angle according to Test Example 4 of the invention.

Referring to FIG. 2, FIG. 3, FIG. 8 and FIG. 9 together, FIG. 8 illustrates a relationship between the luminous transmittance ratio R and the extension width d of the pixel structure at the viewing angle θ3 of about 60 degrees according to Test Example 4 of the invention, and FIG. 9 illustrates a relationship between the reduction amount of luminous transmittance through the first color filter pattern CF1 (which was a red color filter pattern in the test example) and the ratio of the extension width d of the pixel structure at the front viewing angle according to Test Example 4 of the invention. In detail, in the relationship diagram of FIG. 8, the vertical axis indicates the luminous transmittance ratio R, and the horizontal axis indicates the extension width d (in units of μm) of the first extension electrode 113. In the relationship diagram of FIG. 9, the vertical axis indicates the proportion of reduction in luminous transmittance through the first color filter pattern CF1 (which was a red color filter pattern in the test example), and the horizontal axis indicates the extension width d (in units of μm) of the first extension electrode 113, wherein the reduction amount of luminous transmittance was based on the aforementioned Test Example 1-1.

Specifically, in the present test example, when the extension width d of the first extension electrode 113 of the pixel structure was greater than 0 μm and smaller than or equal to about 7 μm, the color mixing problem or the like of the display screen could be alleviated. In addition, in further view of the luminous transmittance through the first color filter pattern CF1 (which was a red color filter pattern in the test example), the extension width d was greater than or equal to about 1 μm and smaller than or equal to about 4.1 μm.

Test Example 5

The present test example made a comparison of the luminous transmittance ratio R of the display panels including the pixel structures of the aforementioned embodiments in terms of the ratio of the electrode spacing e between each of the first extension electrodes 113 to the extension width d of the first extension electrode 113. In the pixel structure of Test Example 5, the ratio (i.e., the aforementioned mathematical expression (2)) of the light blocking width b of the first light blocking pattern layer 160 to the pixel pitch a between the first edge strip electrode 112 and the second edge strip electrode 122 was about 60%, the ratio (i.e., the aforementioned mathematical expression (3)) of the extension length c of the first extension electrode 113 to the pixel pitch a between the first edge strip electrode 112 and the second edge strip electrode 122 was about 13%, and the extension width d of the first extension electrode 113 was about 2.5 μm, wherein the aforementioned ratio of the electrode spacing e between each of the first extension electrodes 113 to the extension width d of the first extension electrode 113 may be represented by mathematical expression (4):

$$\frac{e}{d} \quad (4)$$

Figure 10:
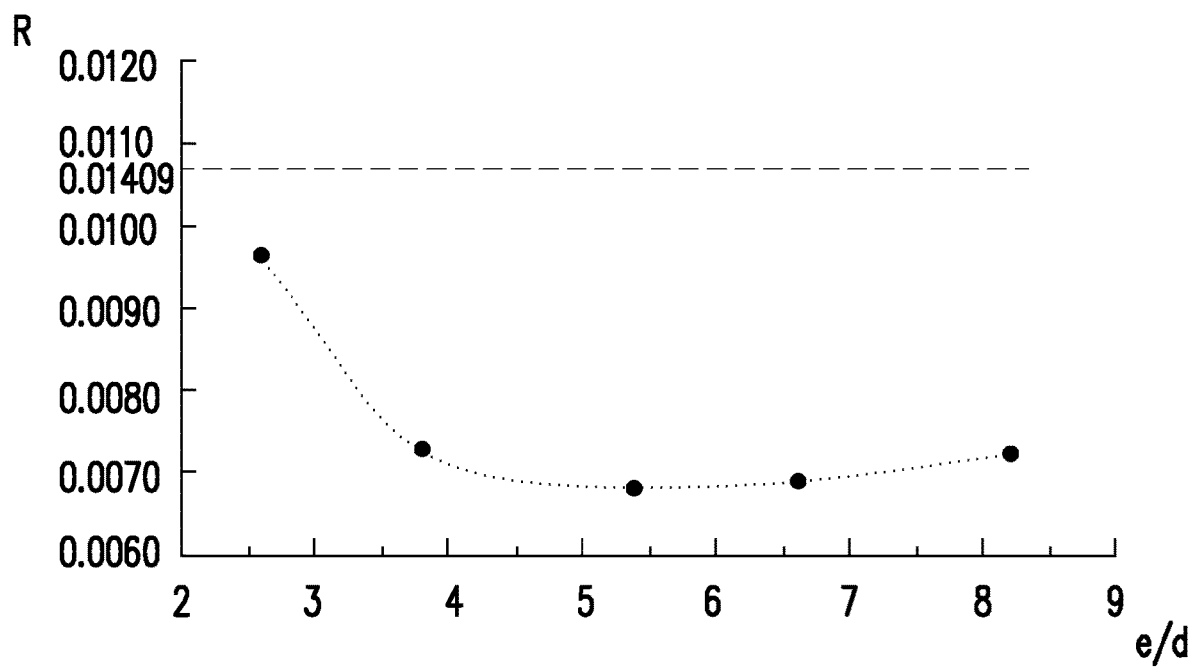
FIG. 10 illustrates a relationship between the luminous transmittance ratio and the ratio of the electrode spacing to the extension width of the pixel structure at a viewing angle of about 60 degrees according to Test Example 5 of the invention.
Figure 11:
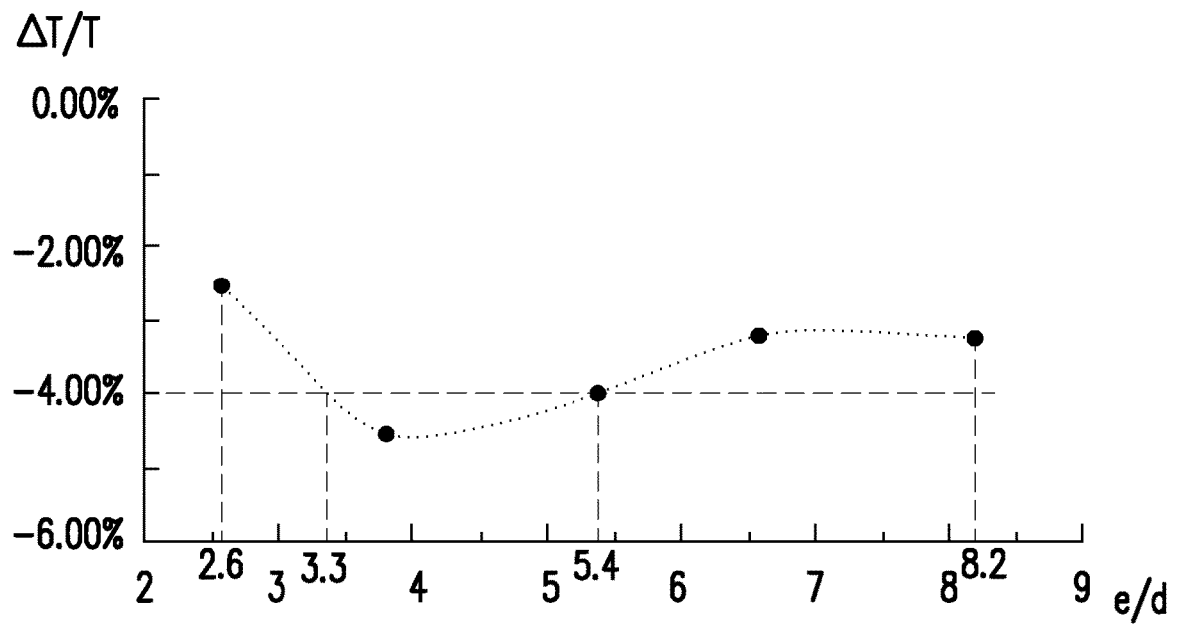
FIG. 11 illustrates a relationship between the reduction amount of luminous transmittance through a first color filter pattern and the ratio of the electrode spacing to the extension width of the pixel structure at a front viewing angle according to Test Example 5 of the invention.

Referring to FIG. 2, FIG. 3, FIG. 10 and FIG. 11 together, FIG. 10 illustrates a relationship between the luminous transmittance ratio R and the ratio of the electrode spacing e to the extension width d of the pixel structure at the viewing angle θ3 of about 60 degrees according to Test Example 5 of the invention, and FIG. 11 illustrates a relationship between the reduction amount of luminous transmittance through the first color filter pattern CF1 (which was a red color filter pattern in the test example) and the ratio of the electrode spacing e to the extension width d of the pixel structure at the front viewing angle according to Test Example 5 of the invention. In detail, in the relationship diagram of FIG. 10, the vertical axis indicates the luminous transmittance ratio R, and the horizontal axis indicates the numerical value represented by mathematical expression (4). In the relationship diagram of FIG. 11, the vertical axis indicates the proportion of reduction in luminous transmittance through the first color filter pattern CF1 (which was a red color filter pattern in the test example), and the horizontal axis indicates the numerical value represented by mathematical expression (4), wherein the reduction amount of luminous transmittance was based on the aforementioned Test Example 1-1.

Specifically, in the present test example, when the first extension electrodes 113 of the pixel structure have the electrode spacing e between one another, the first extension electrode 113 of the pixel structure has the extension width d, and the ratio of the electrode spacing e to the extension width d was greater than or equal to about 2.6 and smaller than or equal to about 8.2, the color mixing problem or the like of the display screen could be alleviated. In addition, in further view of the luminous transmittance through the first color filter pattern CF1 (which was a red color filter pattern in the test example), the ratio of the electrode spacing e to the extension width d was greater than or equal to about 2.6 and smaller than or equal to about 3.3, or greater than or equal to about 5.4 and smaller than or equal to about 8.2.

Test Example 6

The present test example made a comparison of the luminous transmittance ratio R of the display panels including the pixel structures of the aforementioned embodiments in terms of the ratio of the overlapping width f between the first extension electrode 113 and the first light blocking pattern layer 160 to the light blocking width b of the first light blocking pattern layer 160.

Figure 12:
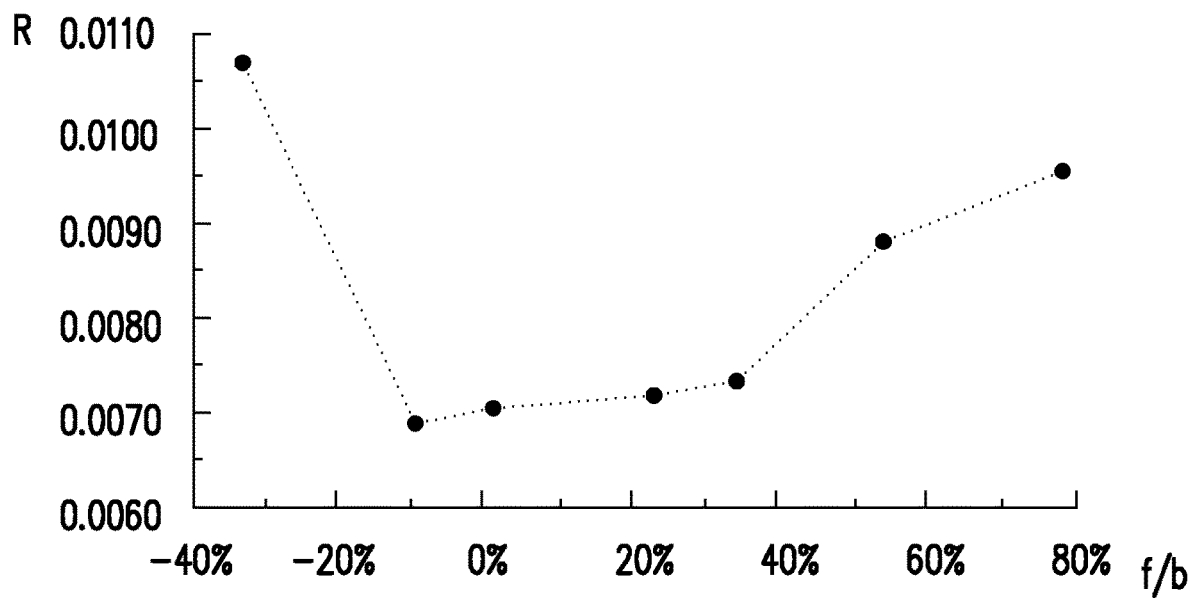
FIG. 12 illustrates a relationship between the luminous transmittance ratio and the ratio of the overlapping width to the light blocking width of the pixel structure at a viewing angle of about 60 degrees according to Test Example 6 of the invention.

Referring to FIG. 2, FIG. 3 and FIG. 12 together, FIG. 12 illustrates a relationship between the luminous transmittance ratio R and the ratio of the overlapping width f to the light blocking width b of the pixel structure at the viewing angle θ3 of about 60 degrees according to Test Example 6 of the invention. In detail, in the relationship diagram of FIG. 12, the vertical axis indicates the luminous transmittance ratio R, and the horizontal axis indicates the ratio of the overlapping width f to the light blocking width b. Specifically, in the present test example, when each of the first extension electrodes 113 and the first light blocking pattern layer 160 in the pixel structure had the overlapping width f therebetween, the first light blocking pattern layer 160 had the light blocking width b, and the ratio of the overlapping width f of each of the first extension electrodes 113 to the light blocking width b was smaller than or equal to about 0.8, the color mixing problem or the like of the display screen could be alleviated, while the transmittance of the display panel could be maintained.

Figure 13:
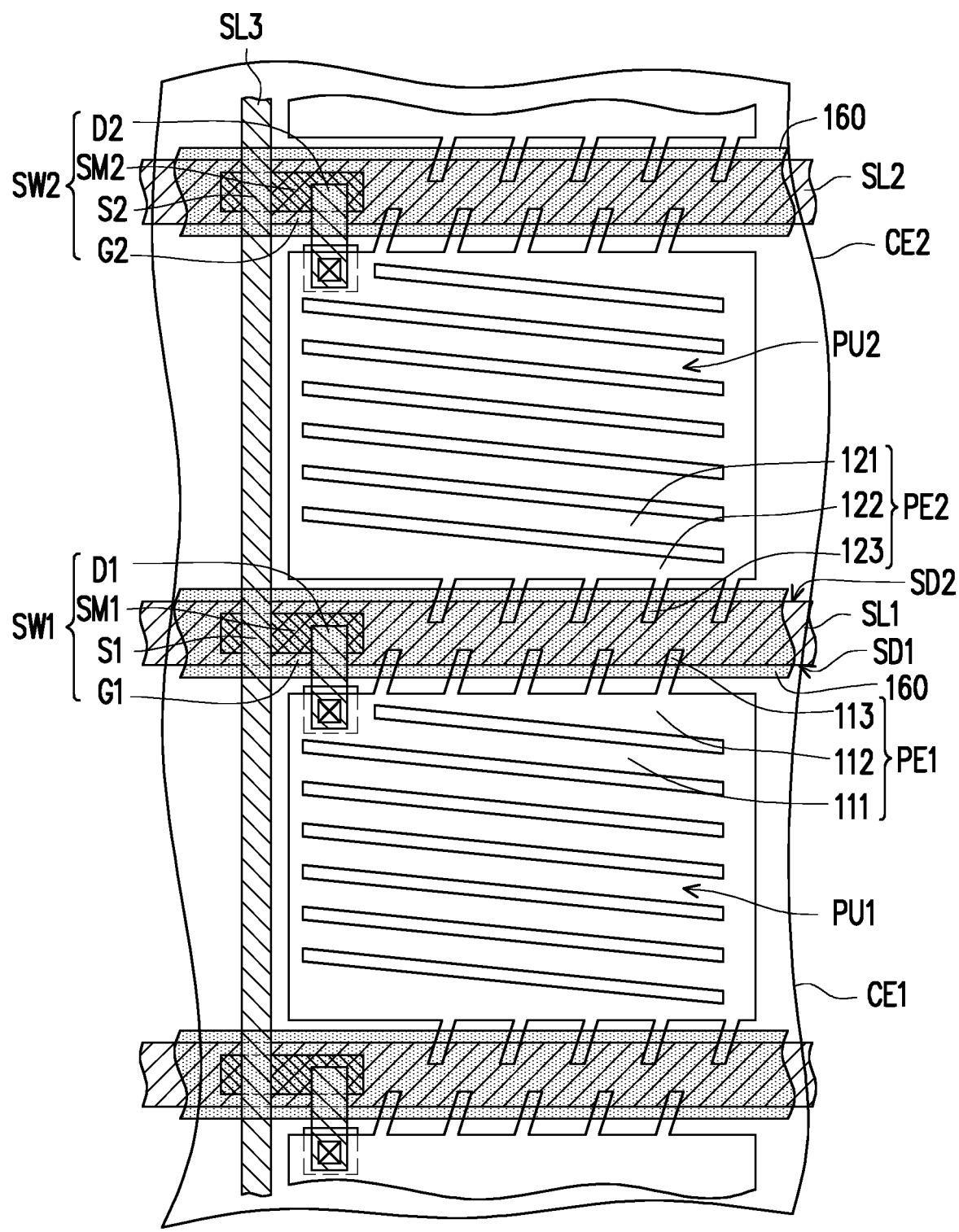
FIG. 13 is a schematic top view of a pixel structure according to another embodiment of the invention.

FIG. 13 is a schematic top view of a pixel structure according to another embodiment of the invention. For clear illustration and ease of explanation, some layers are omitted from FIG. 13. It should be noted that the reference numerals and a part of the content of the embodiment of FIG. 1 are used in the embodiment of FIG. 13, in which the same or similar reference numerals denote the same or similar elements, and repeated description of the same technical content is omitted. For a description of the omitted parts, reference can be found in the aforementioned embodiments, and no repeated description is contained in the following embodiment.

Referring to FIG. 13, a pixel structure 300 of the present embodiment is similar to the pixel structure 100 of the embodiment of FIG. 1, and a difference between the two lies in that the first active device SW1 includes the first gate G1, the first source S1, the first drain D1 and the first channel layer SM1, wherein the first gate G1 is electrically connected to the first signal line SL1, the first source S1 is electrically connected to the third signal line SL3, and the first drain D1 is electrically connected to the first pixel electrode PE1. The second active device SW2 includes the second gate G2, the second source S2, the second drain D2 and the second channel layer SM2, wherein the second gate G2 is electrically connected to the second signal line SL2, the second source S2 is electrically connected to the third signal line SL3, and the second drain D2 is electrically connected to the second pixel electrode PE2. In the present embodiment, the first signal line SL1 and the second signal line SL2 may be different scan lines, while the third signal line SL3 may be a data line. However, the invention is not limited thereto.

In summary, in the pixel structure of the invention, by forming the fringe field having a different direction by the first extension electrode and the second extension electrode, and by the light blocking pattern layer located between the first pixel unit and the second pixel unit, the color mixing problem of the pixel structure can be alleviated, while good transmittance can be maintained. In addition, the display panel that includes the pixel structure of the invention may have better common voltage uniformity and driving capability without additionally increasing resistance-capacitance (RC) loading of the common voltage. Moreover, in human vision, the color mixing problem at side viewing angles can be alleviated, while good transmittance can be maintained, and the viewing angle can be widened.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A pixel structure, comprising:
    a substrate;
    a first signal line disposed on the substrate and having a first side and a second side;
    a first pixel unit disposed on the first side of the first signal line, wherein the first pixel unit comprises:
        a first active device;
        a first common electrode;
        a first insulating layer located on the first common electrode; and
        a first pixel electrode located on the first insulating layer and electrically connected to the first active device, wherein the first pixel electrode comprises a first edge strip electrode and a plurality of first extension electrodes, and the plurality of first extension electrodes respectively extend from the first edge strip electrode toward the first signal line;
    a second pixel unit disposed on the second side of the first signal line, wherein the second pixel unit comprises:
        a second active device;
        a second common electrode;
        a second insulating layer located on the second common electrode; and
        a second pixel electrode located on the second insulating layer and electrically connected to the second active device, wherein the second pixel electrode comprises a second edge strip electrode and a plurality of second extension electrodes, and the plurality of second extension electrodes respectively extend from the second edge strip electrode toward the first signal line; and
    a first light blocking pattern layer located between the first pixel unit and the second pixel unit, the first light blocking pattern layer and the first signal line overlapping with each other, wherein:
        each of the first extension electrodes has a first angle with respect to the first edge strip electrode, and each of the second extension electrodes has a second angle with respect to the second edge strip electrode.

2. The pixel structure according to claim 1, wherein:
    the first pixel electrode further comprises a plurality of first pixel strip electrodes, and the first edge strip electrode is disposed between the plurality of first pixel strip electrodes and the first signal line; and
    the second pixel electrode further comprises a plurality of second pixel strip electrodes, and the second edge strip electrode is disposed between the plurality of second pixel strip electrodes and the first signal line.

3. The pixel structure according to claim 1, further comprising a second signal line and a third signal line, wherein:
    the first active device comprises a first gate, a first drain and a first source, wherein the first source is electrically connected to the first signal line, the first drain is electrically connected to the first pixel electrode, and the first gate is electrically connected to the third signal line; and
    the second active device comprises a second gate, a second drain and a second source, wherein the second source is electrically connected to the second signal line, the second drain is electrically connected to the second pixel electrode, and the second gate is electrically connected to the third signal line.

4. The pixel structure according to claim 1, further comprising a second signal line and a third signal line, wherein:
    the first active device comprises a first gate, a first drain and a first source, wherein the first gate is electrically connected to the first signal line, the first source is electrically connected to the third signal line, and the first drain is electrically connected to the first pixel electrode; and
    the second active device comprises a second gate, a second drain and a second source, wherein the second gate is electrically connected to the second signal line, the second source is electrically connected to the third signal line, and the second drain is electrically connected to the second pixel electrode.

5. The pixel structure according to claim 1, wherein the plurality of first extension electrodes and the plurality of second extension electrodes are disposed alternately.

6. The pixel structure according to claim 1, wherein the first common electrode is electrically connected to the second common electrode, and the first light blocking pattern layer is located above the first common electrode and the second common electrode.

7. The pixel structure according to claim 1, wherein the first common electrode is electrically connected to the second common electrode, and the first common electrode and the second common electrode are located above the first light blocking pattern layer.

8. The pixel structure according to claim 1, wherein the first light blocking pattern layer is electrically connected to the first common electrode and the second common electrode.

9. The pixel structure according to claim 1, wherein a width of the first light blocking pattern layer is greater than a width of the first signal line.

10. The pixel structure according to claim 1, wherein at least one of the first extension electrodes is partially overlapped with the first light blocking pattern layer to define an overlapping width, the first light blocking pattern layer has a light blocking width, and a ratio of the overlapping width to the light blocking width is smaller than or equal to 0.8.

11. The pixel structure according to claim 1, wherein the first edge strip electrode and the second edge strip electrode have a pixel pitch therebetween, the first light blocking pattern layer has a light blocking width, and a ratio of the light blocking width to the pixel pitch is greater than or equal to 0.5 and smaller than or equal to 1.

12. The pixel structure according to claim 1, wherein the first edge strip electrode and the second edge strip electrode have a pixel pitch therebetween, at least one of the first extension electrodes has an extension length, and a ratio of the extension length to the pixel pitch is greater than or equal to 0.13 and smaller than or equal to 0.68.

13. The pixel structure according to claim 1, wherein each of the first extension electrodes has an extension width, and the extension width of the each of the first extension electrodes is greater than 0 μm and smaller than or equal to 7 μm.

14. The pixel structure according to claim 1, wherein any two adjacent first extension electrodes of the plurality of first extension electrodes have an electrode spacing therebetween, each of the first extension electrodes has an extension width, and a ratio of the electrode spacing to the extension width is:
   greater than or equal to 2.6 and smaller than or equal to 3.3; or
   greater than or equal to 5.4 and smaller than or equal to 8.2.

15. A display panel, comprising:
a pixel structure comprising:
   a substrate;
   a first signal line disposed on the substrate and having a first side and a second side;
   a first pixel unit disposed on the first side of the first signal line, wherein the first pixel unit comprises:
      a first active device; and
      a first common electrode;
      a first insulating layer located on the first common electrode; and
      a first pixel electrode located on the first insulating layer and electrically connected to the first active device, wherein the first pixel electrode comprises a first edge strip electrode and a plurality of first extension electrodes, and the plurality of first extension electrodes respectively extend from the first edge strip electrode toward the first signal line;
   a second pixel unit disposed on the second side of the first signal line, wherein the second pixel unit comprises:
      a second active device;
      a second common electrode;
      a second insulating layer located on the second common electrode; and
      a second pixel electrode located on the second insulating layer and electrically connected to the second active device, wherein the second pixel electrode comprises a second edge strip electrode and a plurality of second extension electrodes, and the plurality of second extension electrodes respectively extend from the second edge strip electrode toward the first signal line; and
   a first light blocking pattern layer located between the first pixel unit and the second pixel unit, the first light blocking pattern layer and the first signal line overlapping with each other;
a display medium layer located on the pixel structure;
two color filter patterns, wherein the display medium layer is located between the color filter patterns and the pixel structure, and the two color filter patterns are disposed respectively corresponding to the first pixel unit and the second pixel unit; and
a second light blocking pattern layer located between the two color filter patterns, wherein each of the first extension electrodes has a first angle with respect to the first edge strip electrode, and each of the second extension electrodes has a second angle with respect to the second edge strip electrode.

16. The pixel structure according to claim 1, wherein:
the first pixel electrode further comprises a plurality of first pixel strip electrodes, and the first edge strip electrode is disposed between the plurality of first pixel strip electrodes and the first signal line;
the second pixel electrode further comprises a plurality of second pixel strip electrodes, and the second edge strip electrode is disposed between the plurality of second pixel strip electrodes and the first signal line; and
the first edge strip electrode and the first pixel strip electrode have a slit therebetween, the second edge strip electrode and the second pixel strip electrode have a slit therebetween.

17. The pixel structure according to claim 1,
wherein the first common electrode is disposed between the substrate and the first pixel electrode, and the second common electrode is disposed between the substrate and the second pixel electrode.

* * * * *